(12) United States Patent
Nakata et al.

(10) Patent No.: US 9,403,457 B2
(45) Date of Patent: Aug. 2, 2016

(54) HEADREST, VEHICLE SEAT

(71) Applicant: NHK SPRING CO., LTD., Yokohama-shi (JP)

(72) Inventors: Shinichi Nakata, Yokohama (JP); Tomohiro Hirose, Yokohama (JP); Masaharu Sanpei, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/505,764

(22) Filed: Oct. 3, 2014

(65) Prior Publication Data
US 2015/0097409 A1 Apr. 9, 2015

(30) Foreign Application Priority Data
Oct. 7, 2013 (JP) ................... 2013-210342

(51) Int. Cl.
*B60N 2/48* (2006.01)
(52) U.S. Cl.
CPC .................... *B60N 2/4808* (2013.01)
(58) Field of Classification Search
CPC .................................................. B60N 2/4808
See application file for complete search history.

(56) References Cited

U.S. PATENT DOCUMENTS

| | | | | | |
|---|---|---|---|---|---|
| 4,489,979 A | * | 12/1984 | Zyngier | ............... | B60N 2/4826 297/391 |
| 4,976,493 A | * | 12/1990 | Frankila | ............... | B60N 2/4817 248/408 |
| 6,158,099 A | * | 12/2000 | Skrzypek | ............... | B25B 31/00 29/244 |
| 6,669,150 B2 | * | 12/2003 | Benoit | ................. | F16B 21/084 248/71 |
| 8,042,428 B2 | * | 10/2011 | Shimizu | ............... | B60N 2/4885 297/216.12 |
| 8,118,360 B2 | * | 2/2012 | Oota | .................... | B60N 2/4817 297/216.12 |
| 8,167,376 B2 | * | 5/2012 | Song | .................... | B60N 2/4814 297/217.3 |
| 8,746,801 B2 | * | 6/2014 | Nakata | ................. | B60N 2/4808 297/410 |

FOREIGN PATENT DOCUMENTS

| | | |
|---|---|---|
| JP | 2006-346342 | 12/2006 |
| JP | 2013-070811 | 4/2013 |

OTHER PUBLICATIONS

Notice of Reasons for Rejection to corresponding Japanese Application 2013-210342 mailed on Aug. 26, 2014.

* cited by examiner

*Primary Examiner* — Timothy J Brindley
(74) *Attorney, Agent, or Firm* — Knobbe Martens Olson & Bear LLP

(57) ABSTRACT

There is provided a headrest including a main body member, a stay member, and a stopper member, the stopper member including a circular cylinder shaped circular cylinder portion, a cantilevered portion, a projection portion, and a restriction portion that is formed extending from the circular cylinder portion so as to abut an end portion of a support member when an attempt is made to pull the stay member out from the support members in a projecting state in which both end sides of the stay member are inserted into the support member and project out from end portions of the support members, thereby restricting pulling out of the stay member from the support members.

4 Claims, 13 Drawing Sheets

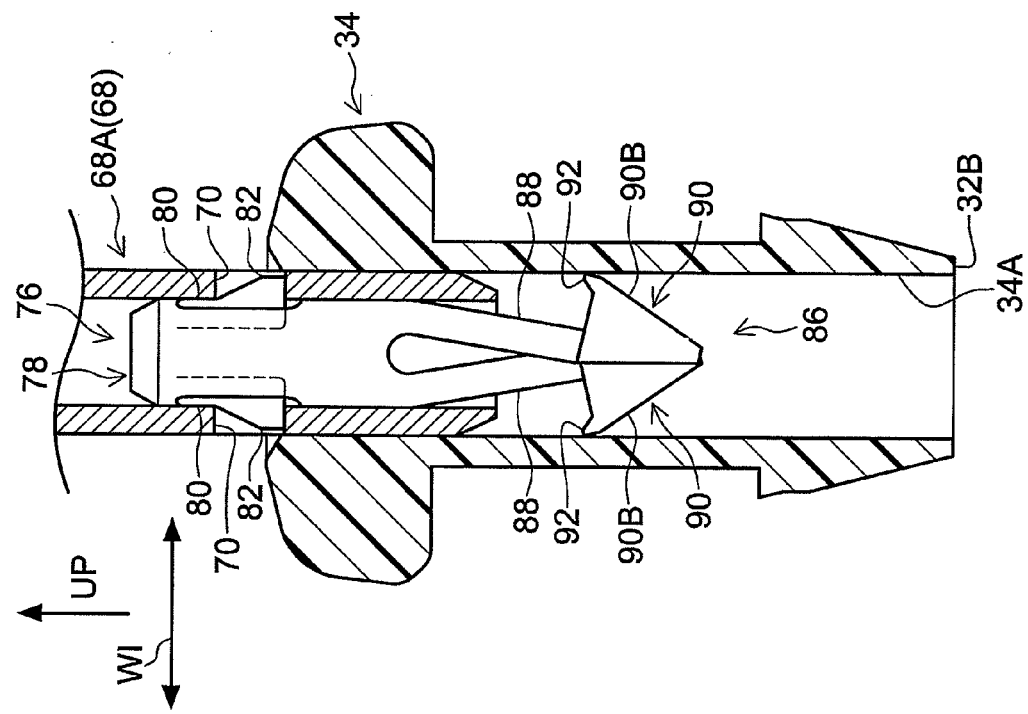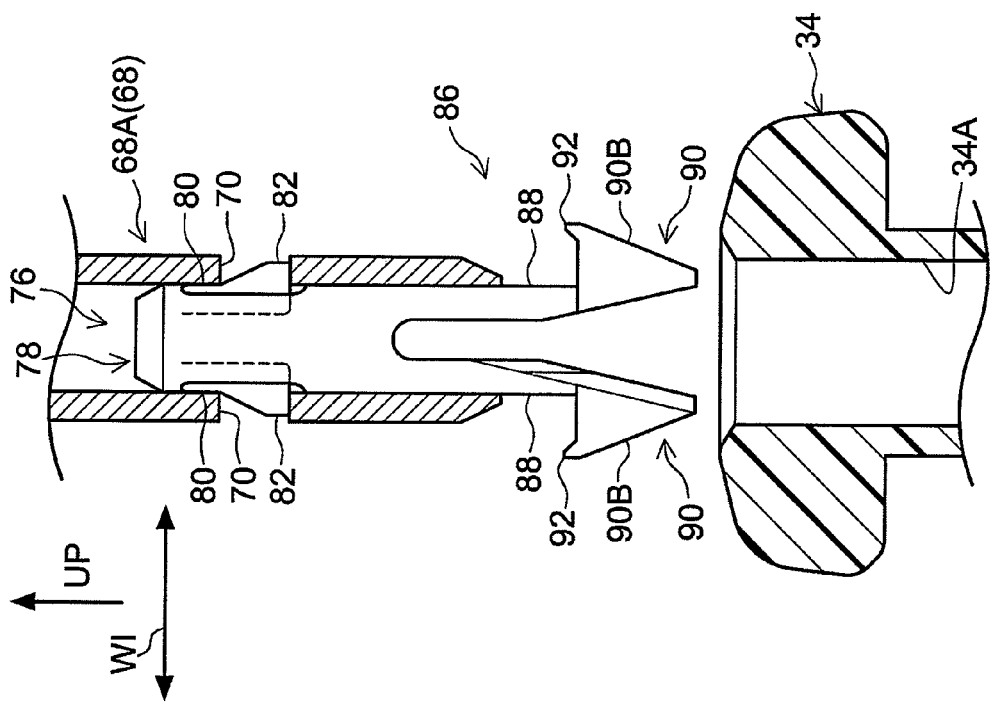

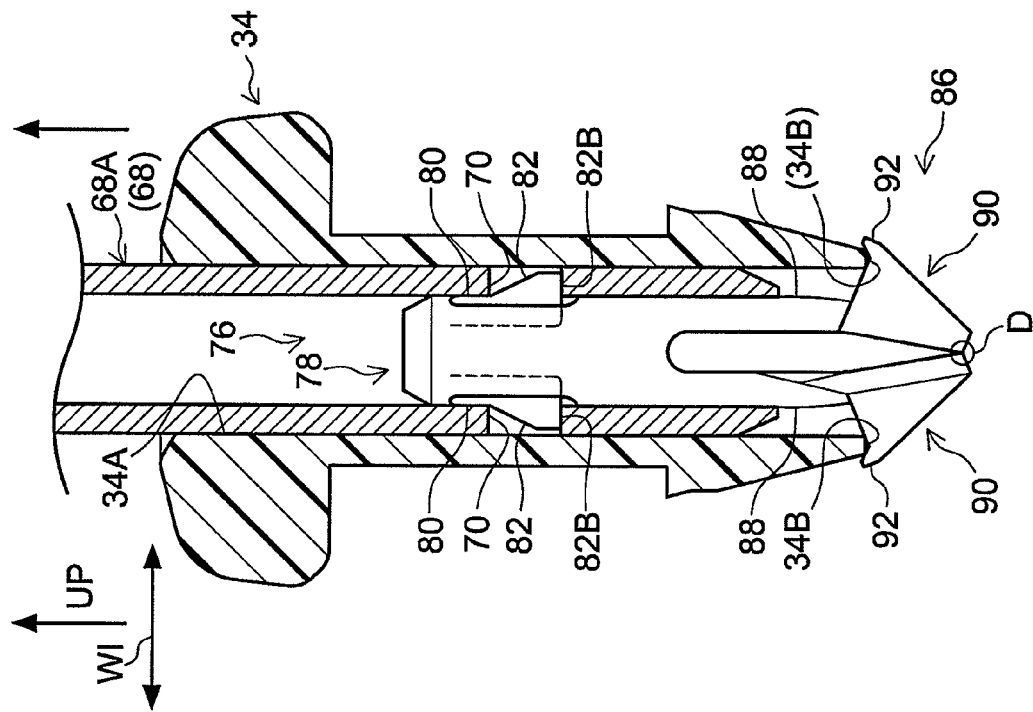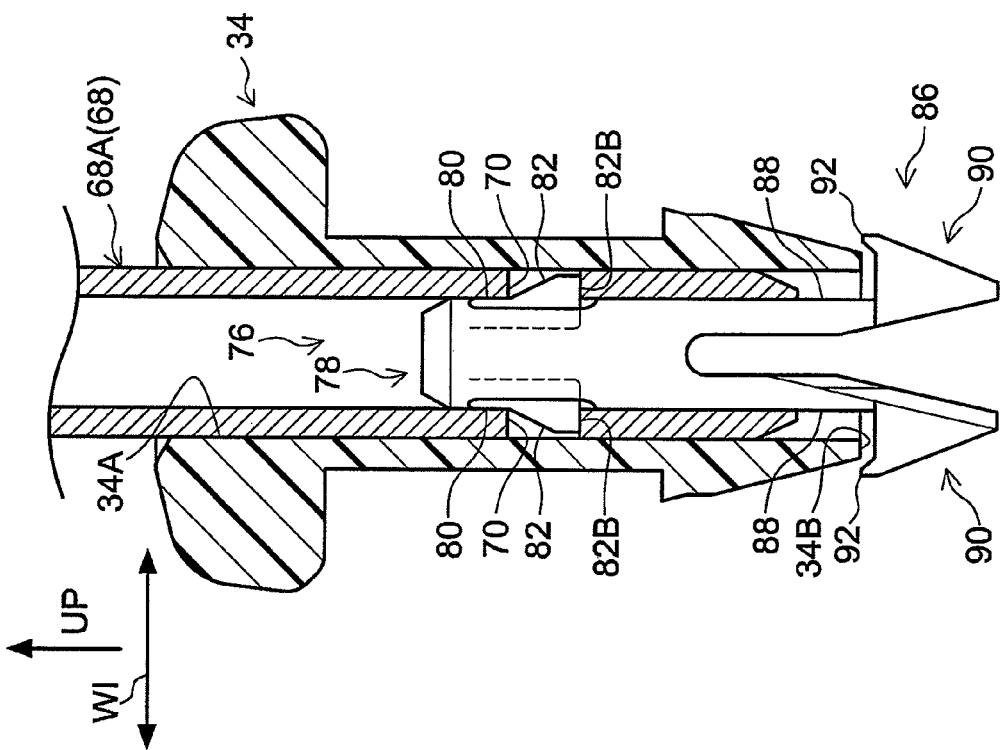

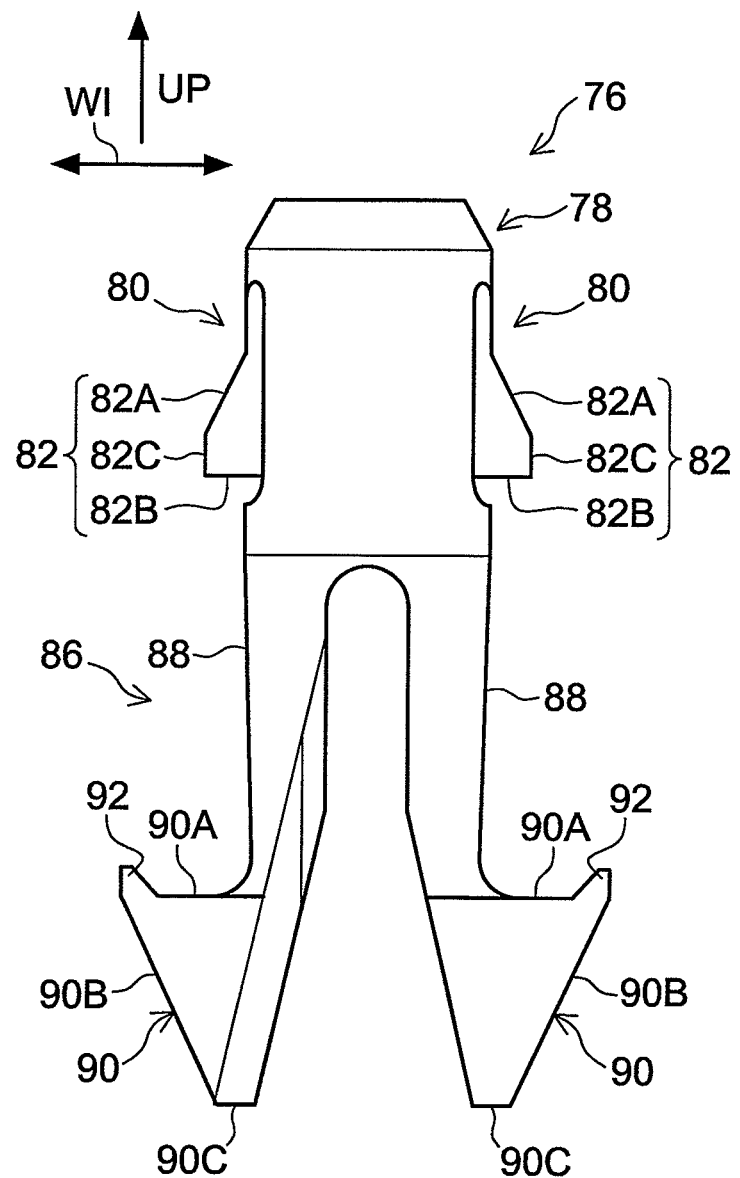

HEADREST, VEHICLE SEAT

CROSS-REFERENCE TO RELATED APPLICATION

This application claims priority under 35 U.S.C 119 from Japanese Patent application No. 2013-210342 filed on Oct. 7, 2013, the disclosure of which is incorporated by reference herein.

BACKGROUND

1. Technical Field

The present invention relates to a headrest and a vehicle seat.

2. Related Art

Japanese Patent Application Laid-Open (JP-A) No. 2006-346342 describes a headrest structure in which a slit is provided to a lower end of a headrest stay (stay member), the slit axially supporting a rotating stopper. The rotating stopper catches on an end portion of a headrest bush provided to a seatback, thereby preventing unintentional removal of the headrest stay from the seatback (back frame).

Such a conventional structure requires plural mechanical procedures such as slit forming and hole forming in order to provide pull-out prevention (a stopper member) at a lower end of a stay member. Such pull-out prevention is configured by plural components such as a rotating stopper and a shaft to axially support the rotating stopper, with a considerable amount of labor being required in assembly of these components.

SUMMARY

An object of the present invention is to restrict removal of a headrest from a back frame with a simple configuration.

The first aspect of the present invention is a headrest including a main body member that supports the head of an occupant, a stay member that is formed by bending a pipe, that supports the main body member, and that is inserted at both end sides into tube shaped support members attached to a back frame that supports the back of the occupant, and a stopper member including a circular cylinder shaped circular cylinder portion that is inserted into an end portion of the stay member, a cantilevered portion that is formed to an outer peripheral face of the circular cylinder portion, and that extends in the axial direction of the circular cylinder portion in a cantilevered state, a projection portion that is formed to a free end of the cantilevered portion so as to project out toward the radial direction outside of the circular cylinder portion, and that engages with a through hole formed to a peripheral face of the stay member on insertion of the circular cylinder portion into the stay member, and a restriction portion that is formed extending from the circular cylinder portion so as to abut an end portion of the support member when an attempt is made to pull the stay member out from the support members in a projecting state in which both end sides of the stay member are inserted into the support member and project out from end portions of the support members, thereby restricting pulling out of the stay member from the support members.

In the first aspect of the present invention, when the circular cylinder portion of the stopper member is inserted into the end portion of the stay member, the projection portion formed to the free end of the cantilevered portion, that is in a cantilevered state, engages with the through hole formed to the peripheral face of the stay member.

In the projecting state in which the stay member is inserted into the support members with a portion of the restriction portion of the stopper member projecting out from the end portion of the support member, when an attempt is made to pull the stay member out from the support members in an attempt to remove the headrest from the back frame, the restriction portion abuts the end portion of the support member, restricting the stay member from being pulled out from the support members.

Moreover, when an attempt is made to pull the stay member out from the support members, a pulling out force acts on the stopper member from the stay member. The projection portion is pressed by the peripheral face of the through hole, and this pressing force is transmitted to the cantilevered portion. A force acts on the cantilevered portion in a compression direction or a pulling direction due to this pressing force. Note that the cantilevered portion is formed to the outer peripheral face of the circular cylinder portion. Namely, the supported end of the cantilevered portion is supported by the circular cylinder portion. Tilting of the cantilevered portion is accordingly restricted, thereby restricting release of the engaged state of the projection portion of the stopper member with the through hole of the stay member.

Removal of the headrest from the back frame can accordingly be restricted with a simple configuration.

The second aspect of the present invention is the headrest of the first aspect, wherein the restriction portion includes leg portions that extend from the circular cylinder portion in one axial direction, and are disposed facing each other, hooked portions that are formed to leading ends of the leg portions and project out toward the radial direction outside, and raised portions that are formed to the radial direction outside of the hooked portions, and project out in the other axial direction, and when an attempt is made to pull the stay member out from the support members in the projecting state, the respective raised portions abut the end portion of the support member, and leading ends of the respective hooked portions abut each other, thereby restricting pulling out of the stay member from the support members.

In the second aspect of the present invention, when an attempt is made to pull the stay member out from the support members in an attempt to remove the headrest from the back frame, the respective raised portions abut the end portion of the support member, and leading ends of the respective hooked portions abut each other. The stay member is accordingly restricted from being pulled out from the support members. In other words, removal of the headrest from the back frame can be restricted with a simple configuration.

The third aspect of the present invention is a vehicle seat including the back frame that supports the back of an occupant, the headrest of either the first aspect or the second aspect, that is attached to the back frame and supports the head of the occupant, and a cushion frame that is attached to a lower end of the back frame, and that supports the buttocks of the occupant.

In the third aspect of the present invention, providing the headrest of the first aspect or the second aspect enables removal of the headrest from the back frame to be restricted.

Advantageous Effects of Invention

The present invention enables removal of a headrest from a back frame to be restricted with a simple configuration.

BRIEF DESCRIPTION OF THE DRAWINGS

Exemplary embodiments of the present invention will be described in detail based on the following figures, wherein:

FIG. 1A and FIG. 1B are cross-sections illustrating an insertion process in which a stay member of a headrest according to an exemplary embodiment of the present invention is inserted into a headrest holder;

FIG. 2A and FIG. 2B are cross-sections illustrating an insertion process in which a stay member of a headrest according to an exemplary embodiment of the present invention is inserted into a headrest holder;

FIG. 5A, FIG. 5B, and FIG. 5C are respectively a face-on view, a side view, and a bottom view illustrating a stopper member provided to a headrest according to an exemplary embodiment of the present invention;

DETAILED DESCRIPTION

Figure 3:
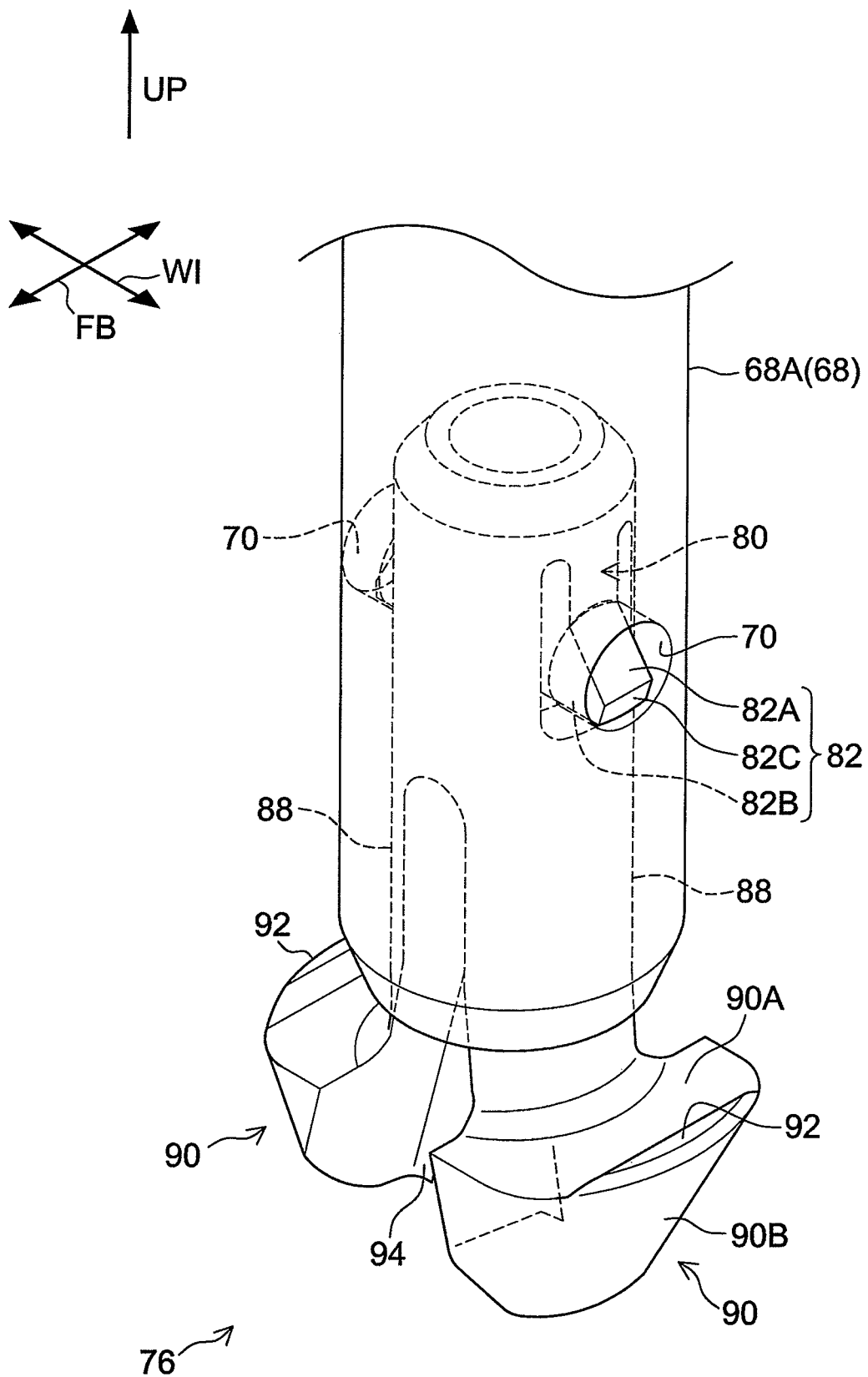
FIG. 3 is a perspective view illustrating members including a stopper member provided to a headrest according to an exemplary embodiment of the present invention.

Explanation follows regarding an example of a headrest and a vehicle seat according to an exemplary embodiment of the present invention, with reference to FIG. 1 to FIG. 9. Note that in the drawings, the arrow UP indicates upward in a vertical direction, the arrow WI indicates the seat width direction, and the arrow FB indicates the seat front-rear direction.

Overall Configuration

Figure 8:
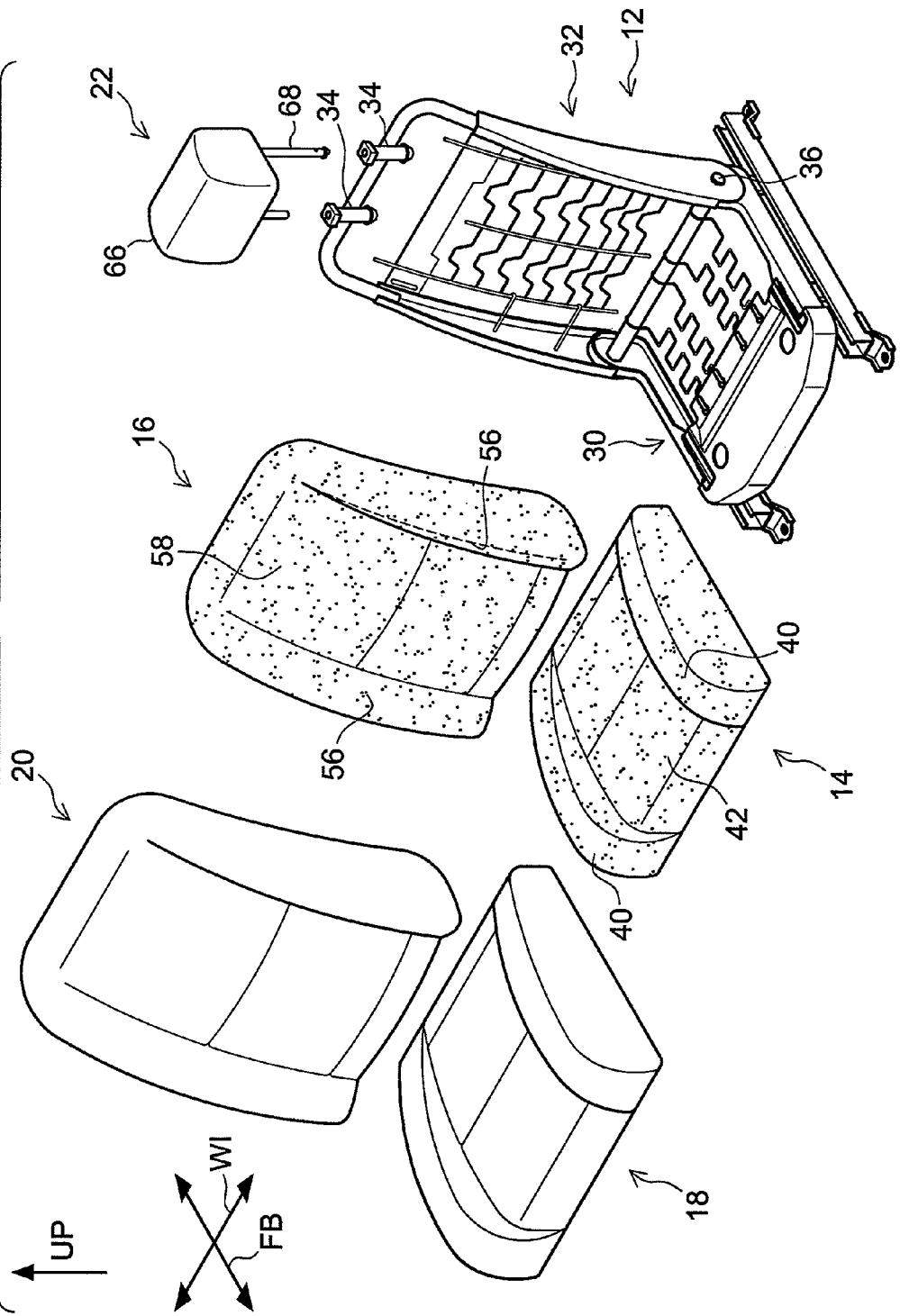
FIG. 8 is an exploded perspective view illustrating a seat according to an exemplary embodiment of the present invention.
Figure 9:
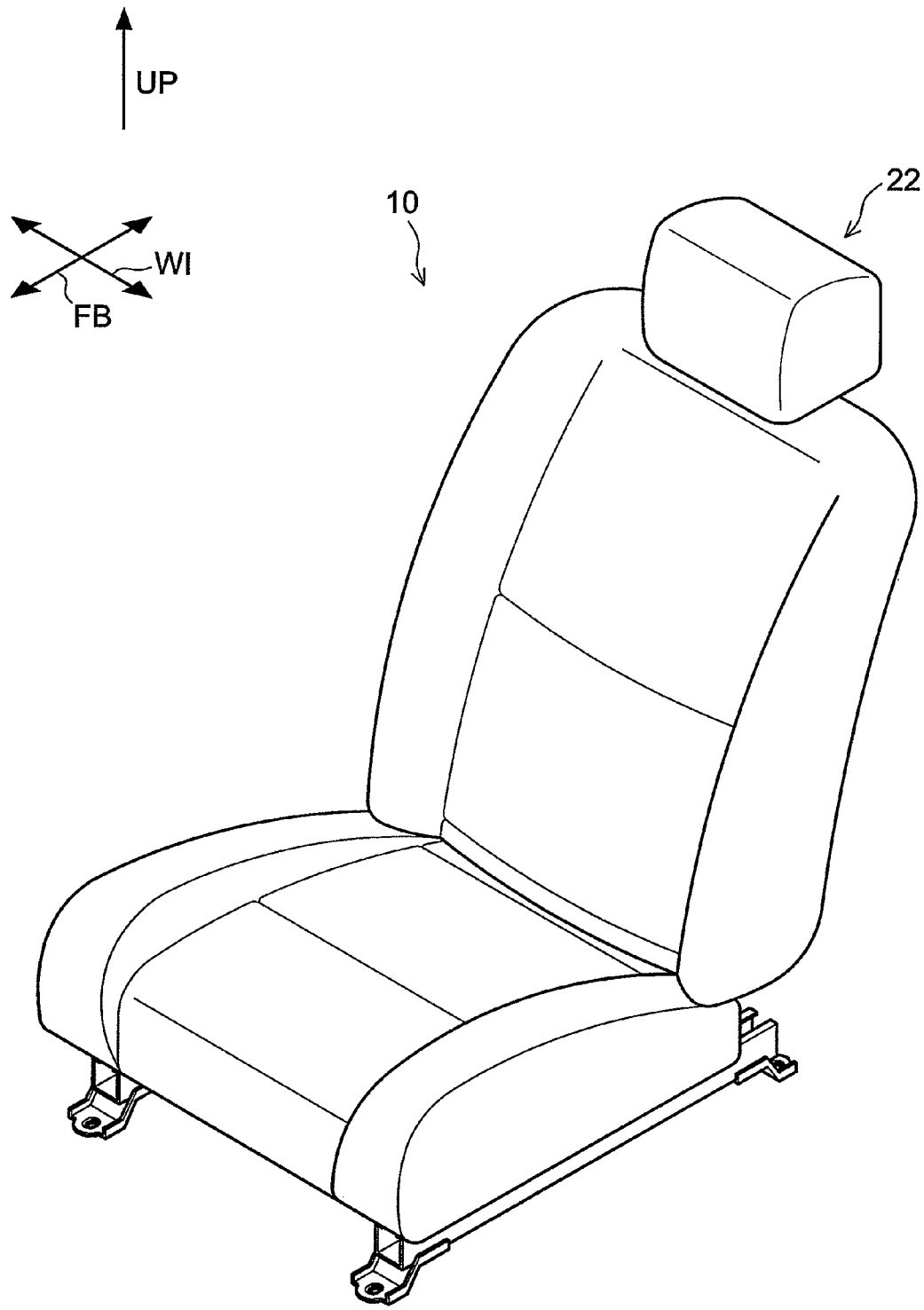
FIG. 9 is perspective view illustrating a seat according to an exemplary embodiment of the present invention.

A vehicle seat 10 (referred to below simply as the "seat 10") is a seat employed in the front row of a vehicle, as illustrated in FIG. 9. As illustrated in FIG. 8, the seat 10 includes a frame 12 serving as a support body, a seat cushion 14 that is attached to the frame 12 and supports the buttocks of a seated occupant, for example, a seatback 16 that is attached to the frame 12 and supports the back, lumbar region, and the like of the seated occupant, and a headrest 22 that is attached to the frame 12 and supports the head of the seated occupant.

The seat 10 also includes a cushion cover 18 that covers the seat cushion 14, and a back cover 20 that covers the seatback 16.

The frame 12 includes a cushion frame 30 that supports the seat cushion 14, and a back frame 32 that supports the seatback 16. In other words, the cushion frame 30 supports the buttocks of the occupant through the seat cushion 14, and the back frame 32 supports the back, lumbar region, and the like of the occupant through the seatback 16.

A front-rear direction rear end of the cushion frame 30 is coupled to a vertical direction lower end of the back frame 32 by a shaft member 36 extending in the seat width direction. The back frame 32 turns about the center of rotation of the shaft member 36.

The back frame 32 is provided with headrest holders 34, serving as an example of a pair of support members that support the headrest 22. Two of the headrest holders 34 are attached to an upper end side of the back frame 32, separated in the seat width direction.

The headrest holders 34 are configured in tube shapes extending in the up-down direction, and both end sides of a stay member 68 of the headrest 22 are inserted into the headrest holders 34. The headrest 22 is thereby attached to the back frame 32 (to the headrest holders 34). Note that the headrest 22 will be described in detail later.

The seat cushion 14 is formed by foam molding a foamable urethane resin, and includes a pair of side support portions 40 that suppress the seated occupant from sliding in the seat width direction, and a main portion 42 that is disposed between the pair of side support portions 40.

The seatback 16 is formed by foam molding a foamable urethane resin, and includes a pair of side support portions 56 that suppress the upper body of the seated occupant from sliding in the seat width direction, and a main portion 58 that is disposed between the pair of side support portions 56.

Configuration of Relevant Portions

Explanation follows regarding configuration of the headrest holders 34 and the headrest 22.

Headrest Holders

Figure 7:
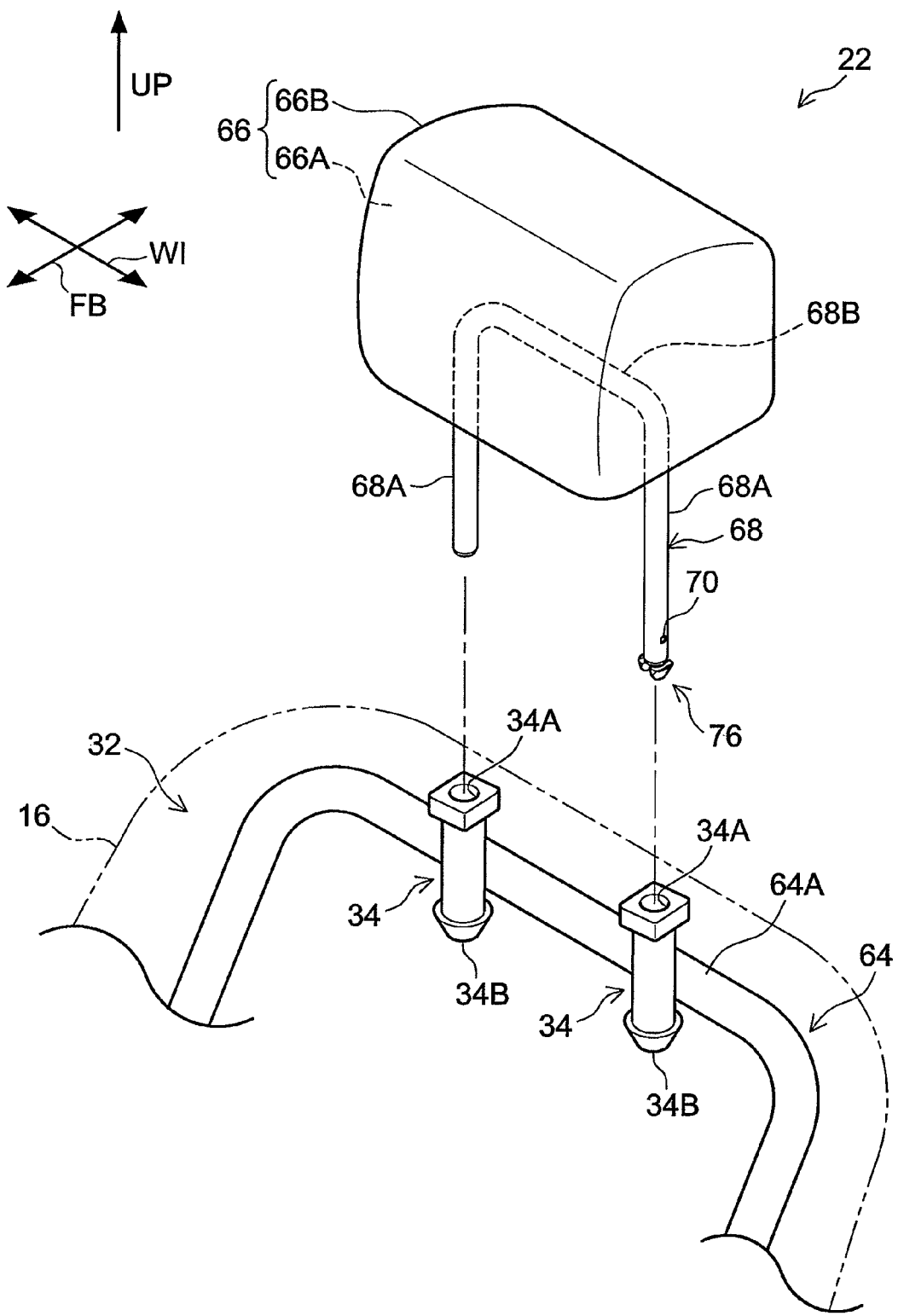
FIG. 7 is a perspective view illustrating members including a headrest according to an exemplary embodiment of the present invention.

The headrest holders 34 are formed from a resin material, and are attached to the back frame 32 as illustrated in FIG. 8. Specifically, as illustrated in FIG. 7, the back frame 32 includes a pipe member 64 configuring the outer periphery of the back frame 32. The pair of headrest holders 34 are attached, with a separation between each other in the seat width direction, to a horizontal portion 64A that extends in the seat width direction at an upper side portion of the pipe member 64 using brackets, not illustrated in the drawings.

Each headrest holder 34 is tube shaped, and is formed with a circular column shaped through hole 34A extending in the vertical direction. Lower ends of the headrest holders 34 are tapered, and a lower end portion 34B (an example of an end portion) of each headrest holder 34 is set with a thinner plate thickness than a general portion.

Headrest

As illustrated in FIG. 7, the headrest 22 includes a main body member 66 that supports the head of the occupant, the stay member 68 that is formed by bending a metal pipe, and that supports the main body member 66, and a stopper member 76 that restricts the headrest 22 from coming away from the back frame 32.

Main Body Portion

As illustrated in FIG. 7, the main body member 66 has a substantially rectangular box shape extending in the seat width direction, and is configured including a pad member 66A serving as a resilient body formed by foam molding a foamable urethane resin, and a cover member 66B that covers the pad member 66A.

Stay Member

As illustrated in FIG. 7, the stay member 68 includes a pair of extending portions 68A that extend in the vertical direction at a separation to each other in the seat width direction, and a coupling portion 68B that extends in the seat width direction and couples together upper ends of the pair of extending portions 68A. The main body member 66 is supported through a bracket or the like, not illustrated in the drawings, at an upper side portion of the stay member 68, and lower side portions of the pair of extending portions 68A of the stay member 68 are respectively inserted into the through holes 34A of the headrest holders 34, thereby attaching the headrest 22 to the back frame 32.

A pair of circular through holes 70 are formed facing each other at the periphery of a lower side portion of one of the extending portions 68A (the one on the right in FIG. 7) (only one of the pair of through holes 70 is illustrated in FIG. 7). The stopper member 76 is attached to a lower side portion of the one extending portion 68A using the through holes 70.

Stopper Member

Figure 4:
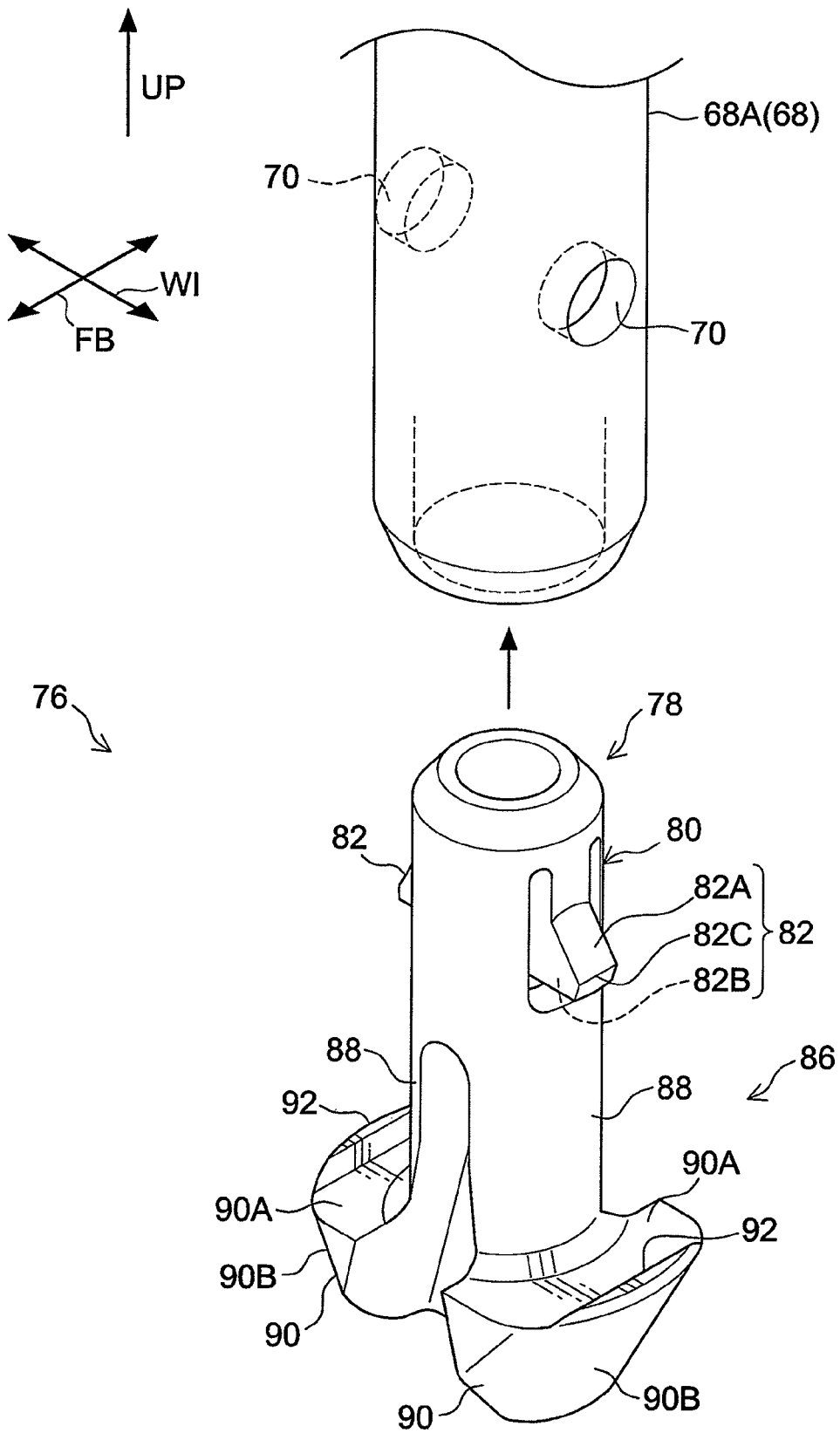
FIG. 4 is an exploded perspective view illustrating members including a stopper member provided to a headrest according to an exemplary embodiment of the present invention.

As illustrated in FIG. 4, the stopper member 76 is formed from a resin material, and includes a circular cylinder shaped circular cylinder portion 78 that is inserted into the one extending portion 68A from the lower end of the extending portion 68A, and a pair of cantilevered portions 80 formed to an outer peripheral face of the circular cylinder portion 78 and extending in the vertical direction (an example of an axial direction of a circular cylinder location) in a cantilevered state.

Figure 5B:
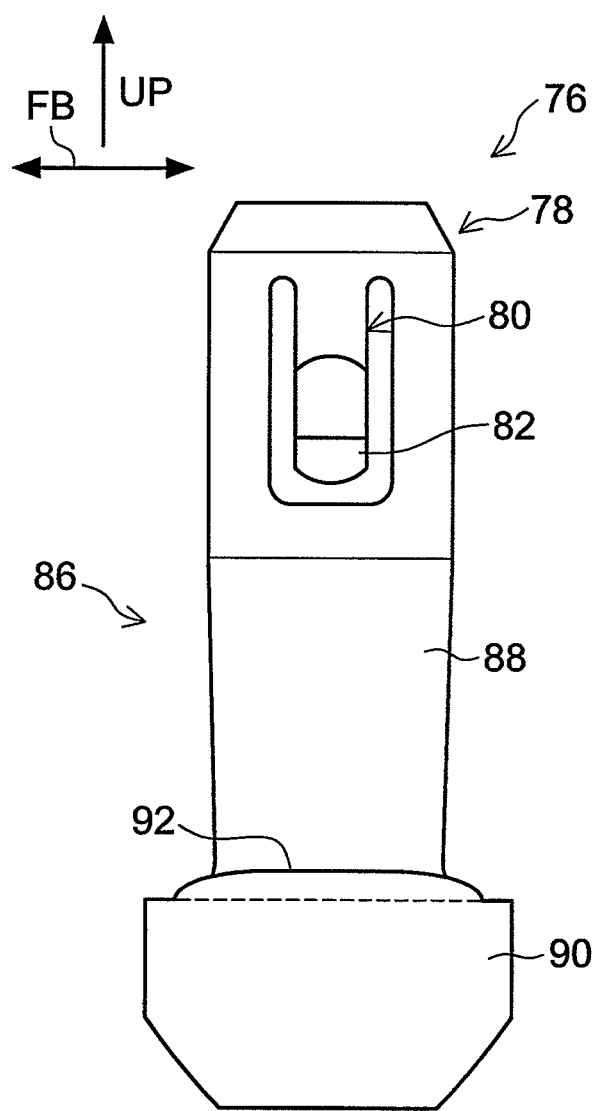

The outer profile dimension of the circular cylinder portion 78 is set smaller than the internal diameter dimension of the extending portion 68A, and an upper end portion of the circular cylinder portion 78 is tapered, as illustrated in FIG. 4, FIG. 5A and FIG. 5B, in consideration of ease of insertion into the extending portion 68A.

The pair of cantilevered portions 80 are disposed facing each other across the seat width direction, and lower ends thereof are configured as the free ends. The free ends of the respective cantilevered portions 80 are formed with projection portions 82 that project toward the outside in the seat width direction (an example of a radial direction of the circular cylinder portion 78), and engage with the through holes 70 formed in the extending portion 68A when the circular cylinder portion 78 is inserted into the extending portion 68A. As illustrated in FIG. 3, the stopper member 76 is attached to the stay member 68 by the engagement of the projection portions 82 with the through holes 70.

As illustrated in FIG. 5A, viewed along the seat front-rear direction, each of the projection portions 82 specifically includes an inclined location 82A that widens toward the seat width direction outside on progression downward, a downward-facing location 82B that faces downward in the vertical direction, and an outside location 82C that straddles between a lower end of the inclined location 82A and an outside edge of the downward-facing location 82B.

With this configuration, when the circular cylinder portion 78 of the stopper member 76 is inserted into the extending portion 68A, the inclined locations 82A of the projection portions 82 are pressed by an inner peripheral face of the extending portion 68A, and the cantilevered portions 80 undergo resilient deformation such that the free ends of the cantilevered portions 80 flex so as to move toward the inside of the circular cylinder portion 78. When the projection portions 82 reach the through holes 70, the cantilevered portions 80 undergo resilient recovery, and the projection portions 82 engage with the through holes 70 (see FIG. 3).

As illustrated in FIG. 3 and FIG. 4, the stopper member 76 further includes a restriction portion 86 that restricts the stay member 68 from being pulled out from the headrest holders 34 in a projecting state in which the stay member 68 is inserted into the headrest holders 34, with portions of the stay member 68 projecting out from the lower end portions 34B of the headrest holders 34.

As illustrated in FIG. 4 and FIG. 5A, the restriction portion 86 includes a pair of leg portions 88 that extend downward in the vertical direction (an example of one direction) from the lower end of the circular cylinder portion 78, and that are disposed facing each other, and hooked portions 90 that are formed to leading ends (lower ends) of the respective leg portions 88 and that project out toward the seat width direction outside. The restriction portion 86 further includes raised portions 92 that are formed at the seat width direction outsides of the respective hooked portions 90 and that project upward in the vertical direction (an example of the other direction).

As illustrated in FIG. 5A, the pair of leg portions 88 are respectively disposed in a cantilevered state at a separation from each other in the seat width direction, as viewed along the seat front-rear direction.

The hooked portions 90 formed to the leading ends of the cantilevered leg portions 88 respectively include an upward facing location 90A facing upward in the vertical direction, an inclined location 90B that extends downward from the periphery of the upward facing location 90A and tapers toward a leading end (lower end), and a downward facing portion 90C that faces downward in the vertical direction at a leading end of the inclined location 90B.

Figure 5C:
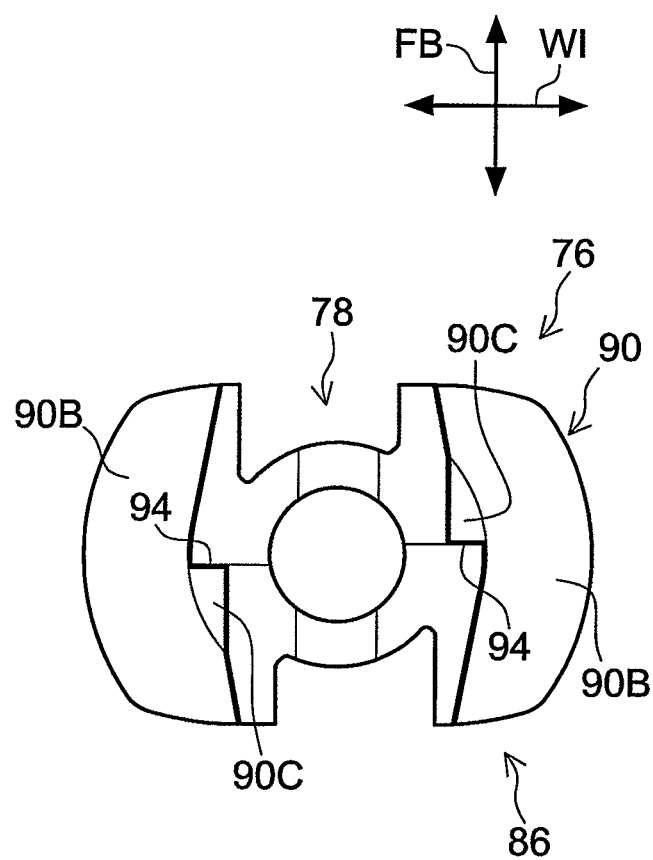

As illustrated in FIG. 5C, as viewed along the vertical direction from below the leg portions 88 and the hooked portions 90, steps 94 are formed to seat width direction inside opposing faces of the leg portions 88 and the hooked portions 90. Specifically, the steps 94 fit around each other when the pair of leg portions 88 flex toward the seat width direction inside. The position and step height of the steps 94 are determined in consideration of the flex amount of the leg portions 88 and the rigidity (seat width direction rigidity) of the leg portions 88 and the hooked portions 90.

As illustrated in FIG. 5A, when the leg portions 88 and the hooked portions 90 are viewed along the seat front-rear direction, mutually opposing faces of lower side portions of the leg portions 88, and of the hooked portions 90, get further apart (so as to widen out) on progression downward.

In this configuration, the hooked portions 90 project out from the lower end portion 34B of the headrest holder 34 in the projecting state described above. Moreover, in this state, when an attempt is made to pull the stay member 68 out from the headrest holders 34, the respective raised portions 92 abut the lower end portion 34B of the headrest holder 34 as illustrated in FIG. 2A and FIG. 2B, and the leading ends of the hooked portions 90 abut each other at the D portion illustrated in FIG. 2B, thereby restricting removal of the stay member 68 from the headrest holder 34.

Operation of Relevant Configuration

Explanation follows regarding operation of relevant configuration, with reference to an attachment process of the stopper member 76 to the stay member 68, and an attachment process of the headrest 22 to the back frame 32 with the stopper member 76 in an attached state to the stay member 68.

Stopper Member Attachment Process

As illustrated in FIG. 4, when attaching the stopper member 76 to the stay member 68, a worker (not illustrated in the drawings) inserts the circular cylinder portion 78 of the stopper member 76 into the end portion of the extending portion 68A of the stay member 68. When the circular cylinder portion 78 is inserted into the extending portion 68A, the inclined locations 82A of the projection portions 82 are pressed by the inner peripheral face of the extending portion 68A, such that the cantilevered portions 80 undergo resilient deformation and the free ends of the cantilevered portions 80 flex so as to move toward the circular cylinder portion 78 inside. When the projection portions 82 reach the through holes 70, as illustrated in FIG. 3, the cantilevered portions 80 undergo resilient recovery, and the projection portions 82 engage with the through holes 70. The stopper member 76 is thereby attached to the stay member 68.

Note that as illustrated in FIG. 3, in the attached state of the stopper member 76 to the stay member 68, the upward facing locations 90A of the hooked portions 90 and the lower end of the extending portion 68A are separated from each other in the vertical direction.

Figure 6A:
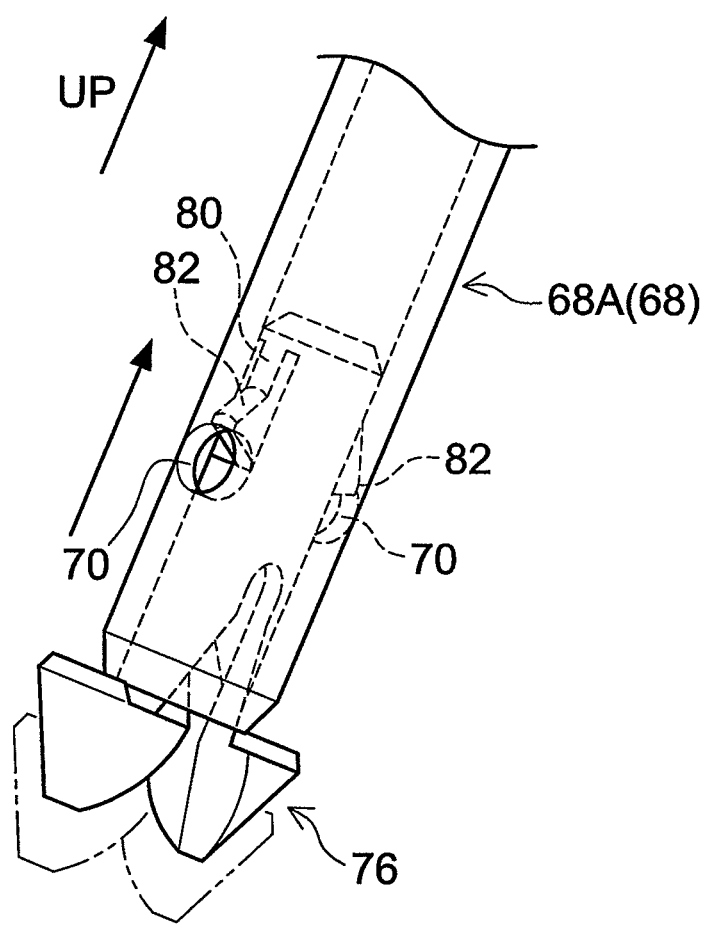
FIG. 6A, FIG. 6B, and FIG. 6C are perspective views illustrating a removal process of a stopper member employed in a headrest according to an exemplary embodiment of the present invention from a stay member.
Figure 6B:
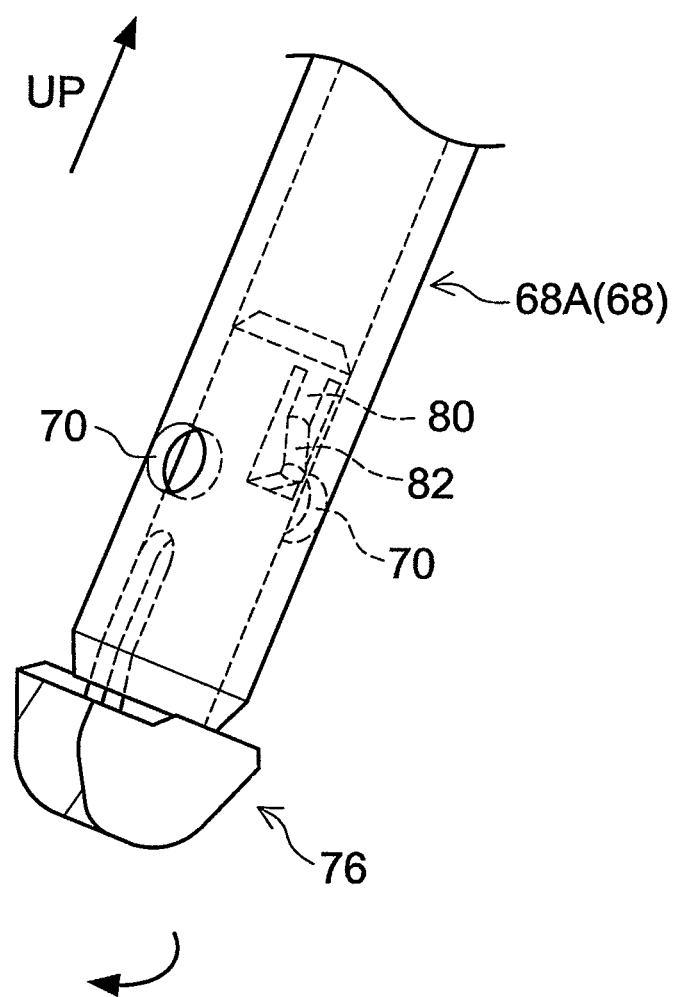
Figure 6C:
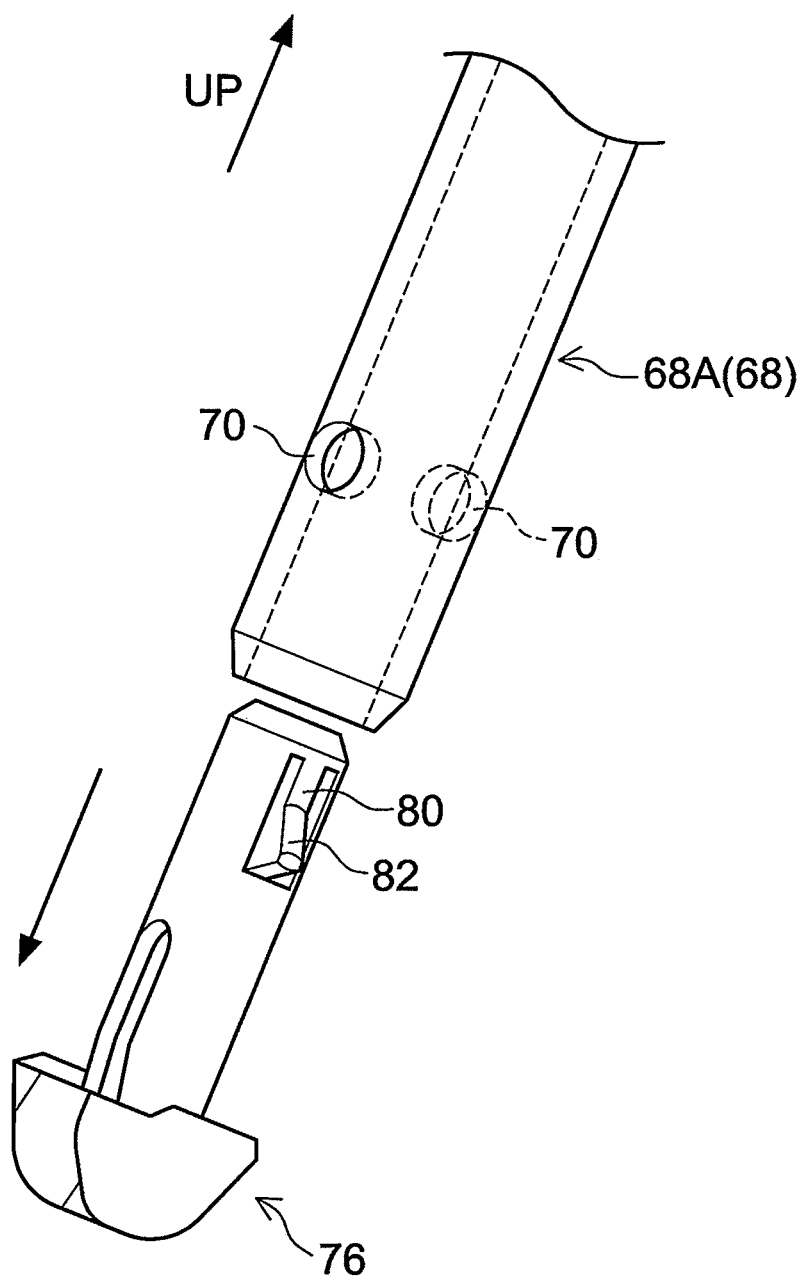

When removing the stopper member 76 from the extending portion 68A, as illustrated in FIG. 6A, the worker pushes the stopper member 76 toward the extending portion 68A, flexing the cantilevered portions 80 such that the projection portions 82 come out of the through holes 70 (releasing engagement). In this state, as illustrated in FIG. 6B, the worker rotates the stopper member 76 by about approximately 90 degrees in the circumferential direction of the extending portion 68A. Then, as illustrated in FIG. 6C, the worker pulls the stopper member 76 out of the extending portion 68A. The stopper member 76 is thereby removed from the extending portion 68A.

Headrest Attachment Process

As illustrated in FIG. 7, when attaching the headrest 22 to the back frame 32, the worker inserts the extending portions 68A at both end sides of the stay member 68 into the through holes 34A of the headrest holders 34 with the stopper member 76 in an attached state to the one extending portion 68A.

When the worker inserts the extending portions 68A into the through holes 34A of the headrest holders 34, as illustrated in FIG. 1A and FIG. 1B, the inclined locations 90B of the hooked portions 90 are pressed by the inner peripheral faces of the through holes 34A, and the entire leg portions 88 undergo resilient deformation and flex.

The worker then inserts the extending portions 68A further into the through holes 34A of the headrest holders 34, and as illustrated in FIG. 2A, the hooked portions 90 project out from the lower end portions 34B of the headrest holders 34 (the projecting state), and the leg portions 88 undergo resilient recovery. The headrest 22 is thereby attached to the back frame 32.

In this projecting state, when an attempt is made to pull the stay member 68 out from the headrest holders 34 in an attempt to remove the headrest 22 from the back frame 32, as illustrated in FIG. 2B, the respective raised portions 92 abut the lower end portion 34B of the headrest holder 34, and the lower ends of the leg portions 88 undergo localized deformation. The leading end portions of the hooked portions 90 abut each other at the D portion illustrated in FIG. 2B due to this localized deformation of the lower ends of the leg portions 88. Removal of the stay member 68 from the headrest holders 34 is accordingly restricted.

In contrast, in the engagement between the projection portions 82 and the through holes 70, when an attempt is made to pull the stay member 68 out from the headrest holders 34, a pulling out force acts on the stopper member 76 from the stay member 68, and as illustrated in FIG. 2B, the downward-facing locations 82B of the projection portions 82 are pressed by the inner peripheral faces of the through holes 70, such that an inward-acting compression force acts on the cantilevered portions 80. Note that the supported ends of the cantilevered portions 80 are supported by the circular cylinder portion 78. Tilting of the cantilevered portions 80 is accordingly restricted, thereby restricting the stopper member 76 from being pulled out from the stay member 68. The stay member 68 is thereby restricted from being pulled out from the headrest holders 34.

Summary

As described above, when an attempt is made to pull the stay member 68 out from the headrest holders 34 in an attempt to remove the headrest 22 from the back frame 32, in the engagement between the projection portions 82 and the through holes 70, the downward-facing locations 82B of the projection portions 82 are pressed by the inner peripheral faces of the through holes 70, and a force acts on the cantilevered portions 80 in a compression direction. Note that the supported ends of the cantilevered portions 80 are supported by the circular cylinder portion 78. Tilting of the cantilevered portions 80 is accordingly restricted, thereby restricting the stopper member 76 from being pulled out from the stay member 68. The stay member 68 is thereby restricted from being pulled out from the headrest holders 34. In other words, removal of the headrest 22 from the back frame 32 can be restricted with a simple configuration.

Moreover, when an attempt is made to pull the stay member 68 out from the headrest holders 34 in an attempt to remove the headrest 22 from the back frame 32, in the restriction portion 86, the respective raised portions 92 abut the lower end portion 34B of the headrest holder 34, and the lower ends of the leg portions 88 undergo localized deformation. The leading end portions of the hooked portions 90 abut each other due to the localized deformation of the lower ends of the leg portions 88. The stay member 68 is accordingly restricted from being pulled out from the headrest holders 34. In other words, removal of the headrest 22 from the back frame 32 can be restricted with a simple configuration.

Moreover, when removing the stopper member 76 from the extending portion 68A, the worker pushes the stopper member 76 toward the extending portion 68A, flexing the cantilevered portions 80 so as to pull the projection portions 82 out from the through holes 70 (release the engagement). Setting the through holes 70 with a circular shape facilitates pressing of the inclined locations 82A of the projection portions 82 by the inner peripheral face of the extending portion 68A so as to flex the cantilevered portions 80, in comparison to when the through holes have a rectangular shape.

Note that a specific exemplary embodiment of the present invention has been described in detail above, however the present invention is not limited to such an exemplary embodiment, and it would be obvious to a practitioner skilled in the art that various embodiments other than that above may be implemented within a range not departing from the spirit of the present invention. For example, although not mentioned specifically in the exemplary embodiment described above, a seat with which the headrest is provided is not limited to a front row vehicle seat, as long as the seat 10 is provided with a headrest 22.

In the exemplary embodiment described above, the stopper member 76 is attached to the one extending portion 68A, however stopper members 76 may be provided to both of the extending portions 68A.

Moreover, in the exemplary embodiment described above, the cantilevered portions 80 are configured with the lower ends extending downward in the vertical direction as the free ends, however the free ends may be configured at upper ends extending upward in the vertical direction. In such cases, tension toward the outside acts on the cantilevered portions 80 when an attempt is made to pull the stay member 68 out from the headrest holders 34.

In the exemplary embodiment described above, the through holes 70 are circular shaped, however the through holes 70 may be elliptical in shape.

In the exemplary embodiment described above, the pair of through holes 70 are formed to the peripheral face of the lower side portion of the extending portion 68A so as to face each other along the seat width direction, however the pair of through holes 70 may be formed to the peripheral face of the lower side portion of the extending portion 68A so as to face each other along the seat front-rear direction. In such cases, the stopper member 76 can be attached to the extending portion 68A by rotating the stopper member 76 by 90 degrees around the extending portion 68A circumferential direction from the orientation in the exemplary embodiment described above.

What is claimed is:

1. A headrest comprising:
a main body member that supports the head of an occupant;
a stay member that is formed by bending a pipe, that supports the main body member, and that is inserted at both end sides into tube shaped support members attached to a back frame that supports the back of the occupant; and
a stopper member including
a circular cylinder shaped circular cylinder portion that is inserted into an end portion of the stay member, the circular cylinder portion having an upper end portion,
a cantilevered portion that is formed to an outer peripheral face of the circular cylinder portion below the upper end portion, and that extends in the axial direction of the circular cylinder portion in a cantilevered state such that a free end of the cantilevered portion is movable in a radial direction relative to the upper end portion,
a projection portion disposed on the free end of the cantilevered portion so as to project out toward the radial direction outside of the circular cylinder portion, and that engages with a through hole formed to a peripheral face of the stay member on insertion of the circular cylinder portion into the stay member, and
a restriction portion that is formed extending from the circular cylinder portion so as to abut an end portion of the support member when an attempt is made to pull the stay member out from the support members in a projecting state in which both end sides of the stay member are inserted into the support members and project out from end portions of the support members, thereby restricting pulling out of the stay member from the support members.

2. The headrest of claim 1, wherein:
the restriction portion includes
leg portions that extend from the circular cylinder portion in one axial direction, and are disposed facing each other,
hooked portions that are formed to leading ends of the leg portions and project out toward the radial direction outside, and
raised portions that are formed to the radial direction outside of the hooked portions, and project out in the other axial direction; and
when an attempt is made to pull the stay member out from the support members in the projecting state, the respective raised portions abut the end portion of the support member, and leading ends of the respective hooked portions abut each other, thereby restricting pulling out of the stay member from the support members.

3. A vehicle seat comprising:
the back frame that supports the back of an occupant;
the headrest of claim 1, that is attached to the back frame and supports the head of the occupant; and
a cushion frame that is attached to a lower end of the back frame, and that supports the buttocks of the occupant.

4. A vehicle seat comprising:
the back frame that supports the back of an occupant;
the headrest of claim 2, that is attached to the back frame and supports the head of the occupant; and
a cushion frame that is attached to a lower end of the back frame, and that supports the buttocks of the occupant.

* * * * *